United States Patent
Ji et al.

(10) Patent No.: US 7,492,787 B2
(45) Date of Patent: Feb. 17, 2009

(54) METHOD, APPARATUS, AND MEDIUM FOR MIGRATION ACROSS LINK TECHNOLOGIES

(75) Inventors: Lusheng Ji, Silver Spring, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 626 days.

(21) Appl. No.: 10/108,473

(22) Filed: Mar. 29, 2002

(65) Prior Publication Data
US 2003/0185233 A1  Oct. 2, 2003

(51) Int. Cl.
*H04J 3/16* (2006.01)
*H04Q 7/00* (2006.01)
*H04Q 7/24* (2006.01)
*H04L 12/56* (2006.01)

(52) U.S. Cl. .................. 370/466; 370/331; 370/338; 370/401

(58) Field of Classification Search ............... 370/437, 370/465–469, 395.5–395.54, 466, 389, 331, 370/392, 401
See application file for complete search history.

(56) References Cited

U.S. PATENT DOCUMENTS

| | | | |
|---|---|---|---|
| 5,323,446 A | | 6/1994 | Kojima et al. |
| 5,442,680 A | | 8/1995 | Schellinger et al. |
| 5,502,726 A | | 3/1996 | Fischer |
| 5,526,489 A | * | 6/1996 | Nilakantan et al. .......... 709/228 |
| 5,570,084 A | | 10/1996 | Ritter et al. |
| 5,583,997 A | | 12/1996 | Hart |
| 5,626,034 A | * | 5/1997 | Manley et al. ............... 62/623 |
| 5,630,061 A | * | 5/1997 | Richter et al. ............... 709/227 |

(Continued)

FOREIGN PATENT DOCUMENTS

GB  2313981  10/1997

(Continued)

OTHER PUBLICATIONS

"Dynamic Network Driver Interface Specification Media Access Control of High-Level Data Link Control and LAN Protocols", IBM TDB Database, #NN9311559, Nov. 1, 1993, (contents same as 5,630,061).*

(Continued)

*Primary Examiner*—Kwang B Yao
*Assistant Examiner*—Warner Wong
(74) *Attorney, Agent, or Firm*—Staas & Halsey LLP

(57) ABSTRACT

A method of migrating across link technologies on an IP-based subnet while maintaining on-going communication comprises selecting a link, and notifying interested hosts of the address of the selected link. A mobile computing devices migrates across link technologies on a subnet while maintaining on-going communication and comprises a link migration module selecting a link, and notifying interested hosts of the address of the selected link, and a dynamic MAC to IP binding module binding a MAC address to an IP address based upon the selected link. A computer-readable medium storing a program which when executed by a computer causes the computer to execute the functions of migrating across link technologies on a subnet while maintaining on-going communication, comprising selecting a link, and notifying interested hosts of the address of the selected link. The migration is executed within the mobile computing device and does not entail modification to the other components of the network.

35 Claims, 10 Drawing Sheets

U.S. PATENT DOCUMENTS

| | | | |
|---|---|---|---|
| 5,982,774 | A | 11/1999 | Foladare et al. |
| 6,005,920 | A | 12/1999 | Fuller et al. |
| 6,052,595 | A | 4/2000 | Schellinger et al. |
| 6,065,062 | A | 5/2000 | Periasamy et al. |
| 6,091,722 | A | 7/2000 | Russell et al. |
| 6,101,543 | A | 8/2000 | Alden et al. |
| 6,151,390 | A | 11/2000 | Volftsun et al. |
| 6,167,025 | A | 12/2000 | Hsing et al. |
| 6,192,414 | B1 | 2/2001 | Horn |
| 6,195,705 | B1 | 2/2001 | Leung |
| 6,215,779 | B1 | 4/2001 | Bender et al. |
| 6,243,754 | B1 | 6/2001 | Guerin et al. |
| 6,243,772 | B1 | 6/2001 | Ghori et al. |
| 6,253,247 | B1 | 6/2001 | Bhaskar et al. |
| 6,282,714 | B1 | 8/2001 | Ghori et al. |
| 6,308,282 | B1 | 10/2001 | Huang et al. |
| 6,330,599 | B1 | 12/2001 | Harvey |
| 6,490,259 | B1 * | 12/2002 | Agrawal et al. ............ 370/331 |
| 6,810,010 | B1 * | 10/2004 | Matsukawa ................ 370/219 |
| 6,826,154 | B2 * | 11/2004 | Subbiah et al. ............ 370/236 |
| 7,009,952 | B1 | 3/2006 | Razavilar et al. ............ 370/331 |
| 7,424,025 | B2 * | 9/2008 | Qian et al. ................ 370/409 |
| 2001/0020275 | A1 | 9/2001 | Jari et al. |
| 2001/0024437 | A1 | 9/2001 | Bender et al. |
| 2001/0031635 | A1 | 10/2001 | Bharatia |
| 2001/0036835 | A1 | 11/2001 | Leedom, Jr. |
| 2002/0031108 | A1 | 3/2002 | Inoue |
| 2002/0147008 | A1 * | 10/2002 | Kallio ........................ 455/426 |
| 2002/0193114 | A1 * | 12/2002 | Agrawal et al. ............ 455/442 |
| 2003/0091011 | A1 * | 5/2003 | Roberts et al. ............. 370/338 |
| 2003/0174682 | A1 * | 9/2003 | Barker, Jr. ................. 370/338 |
| 2004/0017824 | A1 * | 1/2004 | Koenck et al. ............. 370/466 |
| 2005/0041628 | A1 * | 2/2005 | Duggi et al. ............... 370/338 |
| 2005/0198267 | A1 * | 9/2005 | Parks et al. ................ 709/224 |

FOREIGN PATENT DOCUMENTS

| | | |
|---|---|---|
| JP | 10-320327 | 12/1998 |
| JP | 11-355322 | 12/1999 |
| WO | WO97/16793 | 5/1997 |
| WO | WO 01/72076 A1 | 9/2001 |

OTHER PUBLICATIONS

RFC 793. Transmission Control Protocol, www.faqs.org/ftp/rfc/pdf/rfc793.txt.pdf, pp. 4 & 40-41, TCP timeout mechanism.*

W. Richard Stevens, "TCP/IP Illustrated, Volume 1: The protocols," chapter 4—ARP: Address Resolution Protocol (10 pages) and chapter 5—RARP: Reverse Address Resolution Protocol (4 pages) (Addison-Wesley, Reading, Massachusetts, 1994).

Communication pursuant to Article 96(2) EPC issued by the European Patent Office on Nov. 3, 2003 in corresponding European Application No. 03 251 755.9—2412 (4 pages).

Communication pursuant to Article 96(2) EPC issued by the European Patent Office on Nov. 15, 2004 in corresponding European Application No. 03 251 755.9—2412 (4 pages).

Decision on further processing under Article 121(3) EPC issued by the European Patent Office on Mar. 29, 2006 in corresponding European Application No. 03251755.9—2412 (1 page).

Decision to grant a European patent pursuant to article 97(2) EPC issued by the European Patent Office on Jun. 22, 2006 in corresponding European Application No. 03251755.9—2412 / 1349322 (1 page).

John Ionnidis et al., "IP-based Protocols for Mobile Networking", Computer Communications Review Association for Computing Machinery, New York, US, vol. 21, No. 4, Sep. 1, 1991, pp. 235-245.

Communication from the European Patent Office including Search Report mailed Jul. 29, 2003.

Network Working Group, Request for Comments: 826, David C. Plummer (DCP@MIT-MC), dated Nov. 1982, "An Ethernet Address Resolution Protocol—or—Converting Network Protocol Addresses to 48.bit Ethernet Address for Transmission on Ethernet Hardware", http://www.faqs.org/rfc/rfc826.txt, pp. 1-8, printed Mar. 28, 2002.

Network Working Group, Request for Comments: 925, J. Postel, ISI, dated Oct. 1984, "Multi-LAN Address Resolution", http://www.faqs.org/rfc/rfc925.txt, pp. 1-15, printed Mar. 28, 2002.

Official Action issued by the Japanese Patent Office on Dec. 18, 2007 in the corresponding Japanese Patent Application No. 2003-083697 (3 pages).

* cited by examiner

METHOD, APPARATUS, AND MEDIUM FOR MIGRATION ACROSS LINK TECHNOLOGIES

BACKGROUND OF THE INVENTION

1. Field of the Invention

The present invention is related to wireless communications, and, more particularly, to maintaining wireless connections between senders and receivers.

2. Description of the Related Art

In wireless communication, data is transmitted between a sender and a receiver without having a physical connection established between the sender and the receiver. One example of wireless communication is data transmission between a computer program being executed by a sender (such as a mobile computing device, or MCD) and a computer program being executed by a receiver (such as a host computer). To accomplish such data communication, protocols and standards are implemented between the sender and receiver. One model of such protocols and standards is the Open System Interconnect (OSI) model set forth by the International Standards Organization (ISO). The OSI model organizes communication protocols into layers such as the application layer, presentation layer, session layer, transport layer, network layer, link layer, and physical layer.

An example of a networking protocol used in conjunction with the OSI model for both wired and wireless data communication is Transport Control Protocol/Internetwork Protocol (TCP/IP).

There are currently multiple network link technologies, including the Ethernet, wireless local area network (WLAN), Bluetooth, infrared, and others. A network interface card (NIC) implements a network link technology. Characteristics of concurrent network links are that there is no "one-size-fits-all" solution, computing devices likely have multiple interfaces installed, multiple network link options improve user connectivity (by providing different network connection environments and redundant connections), and they are an important feature for mobile computing devices.

Different wireless communication technologies are typically developed for different purposes. For instance, the Bluetooth (IEEE 802.15) and the Infrared technologies are aimed at short-range personal communication (<10 m) while the Wireless LAN (IEEE 802.11, IEEE 802.11b, IEEE 802.11a) is for providing mid-range communication services (<1km). Other wireless communication technologies such as 3-G wireless, wireless routers (i.e., Flash-OFDM Radio Router by Flarion, etc.), and satellite wireless access, are for serving rather large service areas (cells). Due to cost, performance, and many other issues, it is likely that multiple technologies will co-exist in the world of mobile computing because there is simply no "one-size-fits-all" solution. Thus, connectivity-enthusiastic users will be likely to have multiple interface cards installed in their computing device at the same time. Even for small PDA devices there can be multiple network interfaces such as an Infra Red (IR) port or a NIC through PCMCIA, USB, or Compact Flash interfaces. Throughout, the "service area" of each wireless communication technology is referred to as the geographic region in which the link will function under normal operating conditions. Sometimes the same term is used on a wired link technology. In this case it means the region where the user can plug the wired network medium (cable) into his/her computer.

FIG. 1 shows an example broadcast domain 100, which includes a mobile computing device (MCD) 110 coupled to the Ethernet 120. The MCD 110 is coupled, wirelessly, through a Bluetooth network interface card (NIC) to Bluetooth access point 130, which, in turn, is coupled to the wired Ethernet backbone 120. MCD 110 is also coupled, wirelessly, through 802.11b network interface card (NIC) to 802.11b access point 140, which is also coupled to the wired Ethernet 120. MCD 110 is also coupled, wirelessly, through 802.11a network interface card (NIC) to 802.11a access point 170, which is also coupled to the wired Ethernet 120. Moreover, the MCD 110 is coupled through 1000 baseT NIC to fiber channel 150, which is coupled to bridge 160, which in turn, is coupled to Ethernet 120. Thus, the broadcast domain 100 shown in FIG. 1 includes a mobile computing device 110 with multiple link interfaces on the same subnet.

Networks in the Internet are frequently organized into broadcast domains to facilitate routing and other administrative functions. A broadcast domain is the subset of a network within which broadcast ARP messages are distributed to all member host computers. Structurally, this domain may include multiple segments of broadcast mediums, possibly of different underlying link technologies. Over each single broadcast segment, any data frames carried by the network medium can be received by all hosts attached to the segment. These segments can be connected together via devices such as repeaters, hubs (multi-port repeaters), and switches to form larger broadcast segments. These bigger broadcast segments can then be connected using various bridging mechanisms (including any variations of the IEEE 802.1 standard, such as the MAC bridges defined by IEEE 802.1D and the Virtual LANs or VLANs as defined by IEEE 802.1Q) to form a "broadcast domain". Since bridging devices typically perform filtering at the Medium Access Control (MAC) level and not all MAC broadcast frames are distributed over all bridged broadcast segments, some common usage of the term "broadcast domain" excludes bridged broadcast segments. In the above-mentioned definition, as long as broadcast ARP messages can pass through these bridging devices, the bridged broadcast segments are considered to belong to the same broadcast domain. For simplicity the terms "subnet:, "Local Area Network" or "LAN" and "broadcast domain" are used interchangeably. Also, in the following context, the terms "node", "host", and "MCD" are used interchangeably. Sometimes an MCD may be referred to using one of these terms as well when it is not particularly important to emphasize mobility.

The configuration of MCD 110 shown in FIG. 1 is not very common for end hosts on the wired Internet, which usually have only one network interface. Computers with multiple network interfaces are traditionally called "multi-homed" and are set up for data packet forwarding purposes such acting as a router, gateway, or performing firewall functions. Different interface cards on a "multi-homed" computer are typically assigned addresses on different subnets. Because Internet routing is interface-oriented, how a packet is routed into interface A of the destination computer is independent of how a packet is routed into interface B of the same computer. Moreover, the network will treat the routing to interface B as if it is routing for a totally different destination host.

Although there are no rules against a computer having multiple interface cards obtain IP addresses on the same subnet, such configurations are rarely seen in traditional networks. This is because traditional LANs typically use a single link technology, i.e. Ethernet. On such a LAN, multiple interfaces of the same computer inject and absorb data to/from the same physical medium and are served by the same type of link technology. These interfaces are also typically served by the same set of servers on the LAN. There is little benefit for having such a configuration.

On the other hand, in a LAN using wireless technologies the situation is different. The LAN comprises multiple link technologies, as shown in FIG. 1. A typical LAN using wireless technology includes wired segments and wireless segments, which employ different link technologies (i.e., Ethernet 120 for the wired segment and IEEE 802.11 140 for the wireless segment). More complicated LANs may even include multiple wireless segments of different wireless link technologies 130, 140. To utilize these different link technologies, a MCD 110 needs to have multiple interfaces cards for these link technologies 130, 140. Because these NICs are connected to the same LAN 120, the NICs will have addresses on the same subnet. Since service areas of different link technologies may overlap, it is possible for a MCD 110 to have multiple available links connecting to the same subnet. User mobility further complicates the connectivity situation. Due to the service area of different link technologies, a MCD may have different sets of link technologies available at different locations.

Because the set of link technologies available to a MCD changes when it is moving, the MCD often needs to switch the underlying link technology accordingly for ongoing communication sessions. However, such a switching cannot be handled in current systems without affecting the ongoing session. The problem occurs at the transport layer. Communications between applications are established over transport layer connections, which are virtual connections (states) maintained by communicating parties. When the underlying link technology changes, transport layer connections cannot remain intact. Thus, the switch cannot be performed seamlessly. To illustrate the problem of maintaining the transport connection across a link technology switch, a brief review is presented of how transport layer connections are currently established and why a naive switch between link technologies will cause termination of the transport connection.

There are generally two types of transport layer connections existing in TCP/IP networks, the TCP connection and the User Datagram Protocol (UDP) connection. The former is connection-oriented, while the latter is connectionless.

When an application program (or application) needs to set up a peer-to-peer TCP connection with a remote host, the application opens a stream socket and attempts to connect to a specific port of the remote host. Each end of a socket is identified by an IP address and a port number. The port number is an internal parameter to the transport layer used by the network kernel and is typically not modified during the lifetime of the socket. The connection is defined by the 4-tuple (Source IP, Source Port, Destination IP, Destination Port). The local end of the socket is bound to a particular local interface (identified by the interface's IP address) and a port. The local bindings can be either specified by the application or assigned by the IP kernel. The integrity of a connection depends on both ends (IP address and port number) of the connection remaining fixed during the lifetime of the connection. Not only are both ends of the connection used to identify the other party by the end points, various states of the connection are bound to these end points as well. One assumption that is made is that the port number is not affected by any lower layer changes but that the IP address is potentially affected by link layer switching.

To open a UDP connection, an application opens a datagram socket. Although there is no connection state information bound to the end points for a datagram socket, the restriction of fixing connection end points may still exist. Firstly in an IP-layer kernel implementation, if the association of a socket and its locally bound address (local interface) is static, changing the link technology serving a socket while a socket is still active may result in connection termination since the IP kernel can not deliver incoming packets (from the new link technology interface) to the correct socket (which is still bound to the old link technology interface). Outgoing data traffic from the socket cannot use the new link technology either for the same reason. Secondly in the application layer, since datagram sockets have the same Application Programming Interface (API) as stream sockets, although not required, some applications may still bind datagram sockets to the local IP address and port number at the beginning of socket invocation and thus fix the binding. Some other applications, while only using the connectionless part of the API system calls, may internally remember the IP address and port number of the remote end (either by reading from the first packet coming from that end or by user input). These applications then read from their own memory to obtain the destination socket identity when the application sends a packet to the other end. If so, the connection end points must remain unchanged during a socket's lifetime.

Thus, in the related art, to maintain the integrity of a transport layer connection, the IP addresses of both ends of the connection need to remain unchanged during the whole lifetime of the connection. Any change of end point identity may result in connection termination.

While a receiver (i.e., a user) is stationary with respect to a sender, the above constraint is usually not a problem because the available link technology will usually remain unchanged during a socket's lifetime. However, if either the receiver or the sender moves (such as in the case of a mobile user), such restrictions will prevent transparent handoff across link technologies, as explained in the following scenario.

Consider the scenario that a user has a MCD 110 comprising a laptop equipped with one 802.11 card and one Ethernet card. When the user having an MCD 110 is at location A, which is served by both Ethernet 130 and 802.11 140 access points, a transport connection is established over the Ethernet 130 interface card. Then, the user (that is, MCD 110) unplugs the Ethernet cable. Even though the laptop (or MCD 110) is still in the service area of an 802.11 access point 140 and remains connected to the rest of the network 120, the previously established transport connection cannot continue because the link layer connection for the transport connection (over Ethernet) is gone.

FIG. 2 shows a transport connection 200 established between applications 202 and 280. As shown in the transport connection 200, an application 202 is coupled to a network kernel 204 through a socket 206. The socket 206 experiences binding to a Network Link Device Representation (NLDR) 208, which interfaces to a device driver (MAC) 210. The NLDR, as used herein, is the network layer software representation of a device. The MAC 210 in turn, interfaces to a network interface card, such as Ethernet network interface card 220, which interfaces to a network 240. The network 240 then interfaces to a network interface card, such as Ethernet NIC 250, which interfaces to device driver 260. A device driver 260 then interfaces to the network kernel 270 (the internals of the network kernel 270 have the same structure as the network kernel 204, which has a NLDR 274 and a socket 272), which interfaces to application 280. On the sender 296, in addition to the stack for Ethernet (208, 210, and 220), there is another similar stack for the wireless LAN network interface card 290, interfacing to MAC 292, interfacing to NLDR 294. Since the transport connection is established via the Ethernet, this wireless LAN stack is currently not bound to any socket used by application 202.

There are problems associated with switching to an alternative network link in the related art. In order to properly use a specific socket or transport connection, the proper sequence of modules needs to be invoked with the correct address and data parameters. This relationship is called binding. In current systems, the binding between 210 and 220 is static. It is created when the NIC is initialized and released when the NIC is stopped or removed. The binding between 208 and 210, also called MAC to IP binding, is semi-static. Semi-static means there are ways to change this binding (typically through manually inputted commands) but the change should not happen during normal operation. Thus the binding from NLDR 208 to the physical network interface 220 is static or semi-static. Further, the association between an IP address, which serves as the tag for NLDR, and the NIC is also static or semi-static. As discussed before, a socket or a transport layer connection, is defined by a 4-tuple (Source IP, Source Port, Destination IP, Destination Port) and this 4-tuple should remain unchanged during the lifetime of the socket. Therefore, the association between a socket and the link technology it uses becomes static or semi-static as well. Within such a framework, an alternative link technology and its associated stack (290, 292, and 294) cannot be used by the existing transport connection established over the original link technology and its associated stack (220, 210, and 208) due to the static or semi-static bindings.

Also known in the art are various multi-link devices such as fiber optic cards that have multiple connections to a fiber switch for fault tolerance (that is, path protection in the telecommunication field), and cellular phones that switch between cellular mode and cordless mode. In addition, known in the art is the use of multiple links for load balancing and to increase bandwidth. Moreover, multiple links have been used concurrently for obtaining large files and to decrease file access times. Fault tolerance is known in the art and is generally used on the same link technology. However, conventional fault tolerance typically disrupts on-going communication if not used on the same link technology or same interface card, is not generally used for mobile communication, and is invoked when there is a failure.

To roam across link technology service areas, a mobile computing device must be able to determine link availability and quality, and select which link technology to use. If there is only one technology available, a mobile computing device needs to detect it and use it. If there are multiple technologies available, a mobile computing device should be able to find out which is the best one to use. Recently, some link selection capability is supported in several software packages (e.g., Windows XP or Intel ProSet II) that allow a user to provide a prioritized list of preferred links. Then, the highest priority link that is available is selected as the preferred link and the outgoing routes may be updated. These existing methods choose a link based solely on availability and do not address the problem of switching links while maintaining transport connection. In addition, the desirability of a particular link technology may depend on many factors, such as signal to noise ratio (SNR), cost for use, quality of service or traffic load. These factors can be dynamically determined and used, in addition to availability, for link selection.

SUMMARY OF THE INVENTION

An aspect of the invention is to provide a mobile device capable of automatically sensing the service quality of different connectivity technologies and transparently configuring the system to use the best data link of the moment to offer much better value and user experiences.

Another aspect of the invention is to enable mobile users to maintain transport connections while moving across boundaries of the service areas of different link technologies within a subnet.

A further aspect of the invention is to provide a method for switching between link technologies within a subnet while maintaining the transport layer connection.

The present invention, Migration Across Link Technologies (MALT), comprises a method that allows a device to transparently switch between link-layer technologies within a communications subnetwork using TCP/IP-based networking (as in the internet).

More particularly, the present invention comprises a method of migrating across link technologies connected to a device on an IP-based subnet while maintaining on-going communication. The method of the present invention comprises selecting a link, migrating the on-going communication to the selected link, and notifying interested hosts of the address of the selected link.

In the present invention, on-going communication includes end-to-end communication. End-to-end communication occurs between user applications, which are in application layer. These applications utilize connections provided by transport layer and above, not the network layer, which chooses the next link for forwarding.

Moreover, the present invention comprises a mobile computing device migrating across link technologies connected to the device on an IP-based subnet while maintaining on-going communication. The mobile computing device (or client-side computer) of the present invention comprises a link migration module selecting a link and notifying interested hosts of the MAC address of the selected link, and a dynamic MAC to IP binding module that can dynamically change the binding of an IP address to a different MAC address based upon the selected link.

In the present invention, the IP (or Internet Protocol) address remains fixed for the lifetime of the transport connection while the MAC address is dynamically changed. That is, the present invention dynamically changes the relationship between the MAC address and the IP address.

In addition, the present invention comprises a computer-readable medium storing a program which when executed by a computer causes the computer to execute the functions of migrating across link technologies connected to a device on an IP-based subnet while maintaining on-going communication. The medium of the present invention comprises selecting a link, migrating the on-going communication to the selected link, and notifying interested hosts of the address of the selected link.

The present invention permits a device such as a laptop computer (or mobile computing device or other client-side computer) to switch between two or more communication link technologies (such as the Ethernet, infrared, and IEEE 802.11 wireless local area network radio links) while preserving the transport layer connection, and thus, maintaining a user's application without interruption.

The present invention is based on an extension of the Address Resolution Protocol (ARP) [RFC (Request for Comment, published by the Internet Engineering Task Force (IETF)) 826, D. Plummer, "An Ethernet Address Resolution Protocol: Or Converting Network Protocol Addresses to 48.bit Ethernet Addresses for Transmission on Ethernet Hardware", RFC826, November 1982], commonly used on local area networks (LANs) connected to the internet.

The present invention is applicable to links that reside on the same subnet and results in more efficient operation. The present invention can be completed on an MCD (or client-side computer), thus avoiding any modification to Internet infrastructure. Conventional methods based on Mobile-IP and Mobile Ad Hoc Network (MANET) solutions to the problem may solve the problem but would entail internet infrastructure modifications and more overhead in terms of messaging than would the use of the present invention.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

On a mobile computing device, the MALT of the present invention causes the communication that is flowing through one link technology interface to be switched to flow through another link technology interface. These link technology interfaces are generally located on separate network interface cards and could be of the same technology or of different technologies. These technologies may include wireless and wired media. Thus, the MALT of the present invention migrates on-going communication across link technologies.

The MALT of the present invention accomplishes the migration across link technologies by dynamically binding a new MAC address corresponding to a new link technology to an IP address in use by a transport connection (through the previous binding of a prior MAC address to the same IP address), thereby shielding the link change from the transport connection. Thus, the dynamic binding of the MALT of the present invention does not change the IP address, accordingly hiding the migration across link technologies of the present invention from the transport connection.

The present invention comprises a computer program that is always executed after the system starts up (also known as a daemon). Depending upon the operating system that the mobile computing device (MCD, or client-side computer) is using, some part of the network kernel of the operating system of the MCD may be modified to implement the present invention.

Moreover, the present invention makes use of the "Proxy ARP" and "Gratuitous ARP" methods to correctly reroute IP packets at the link level following a link technology switch and the maintenance of an associated "Interested Host Cache".

The present invention provides mobile devices with the capability to sense automatically the service quality of different connectivity technologies and transparently configure the system to use the best data link of the moment, which will offer much better value and user experiences. Moreover, the present invention enables mobile users to maintain transport connections while moving across boundaries of the service areas of different link technologies.

Figure 1:
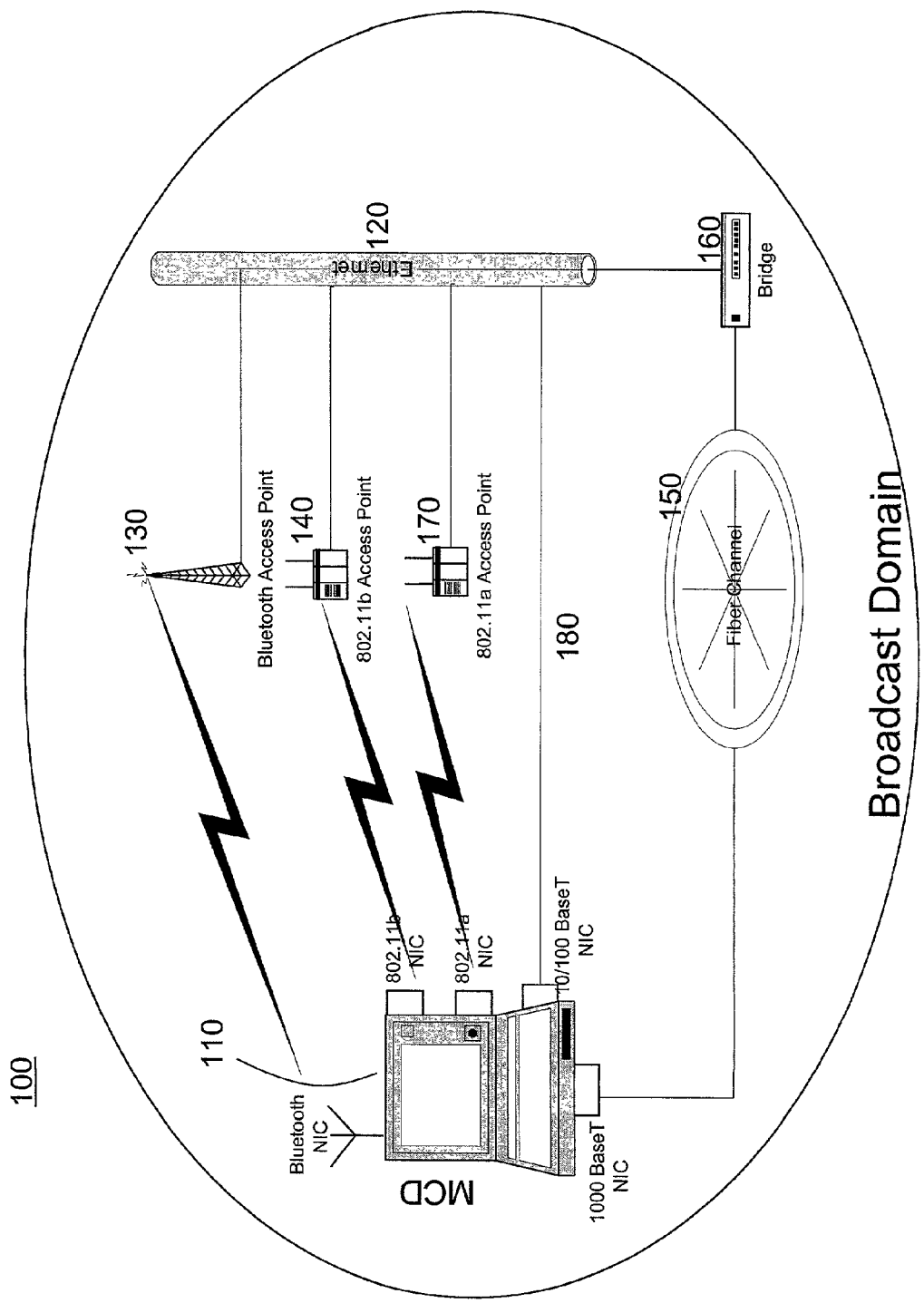
FIG. 1 shows a broadcast domain of the related art.
Figure 2:
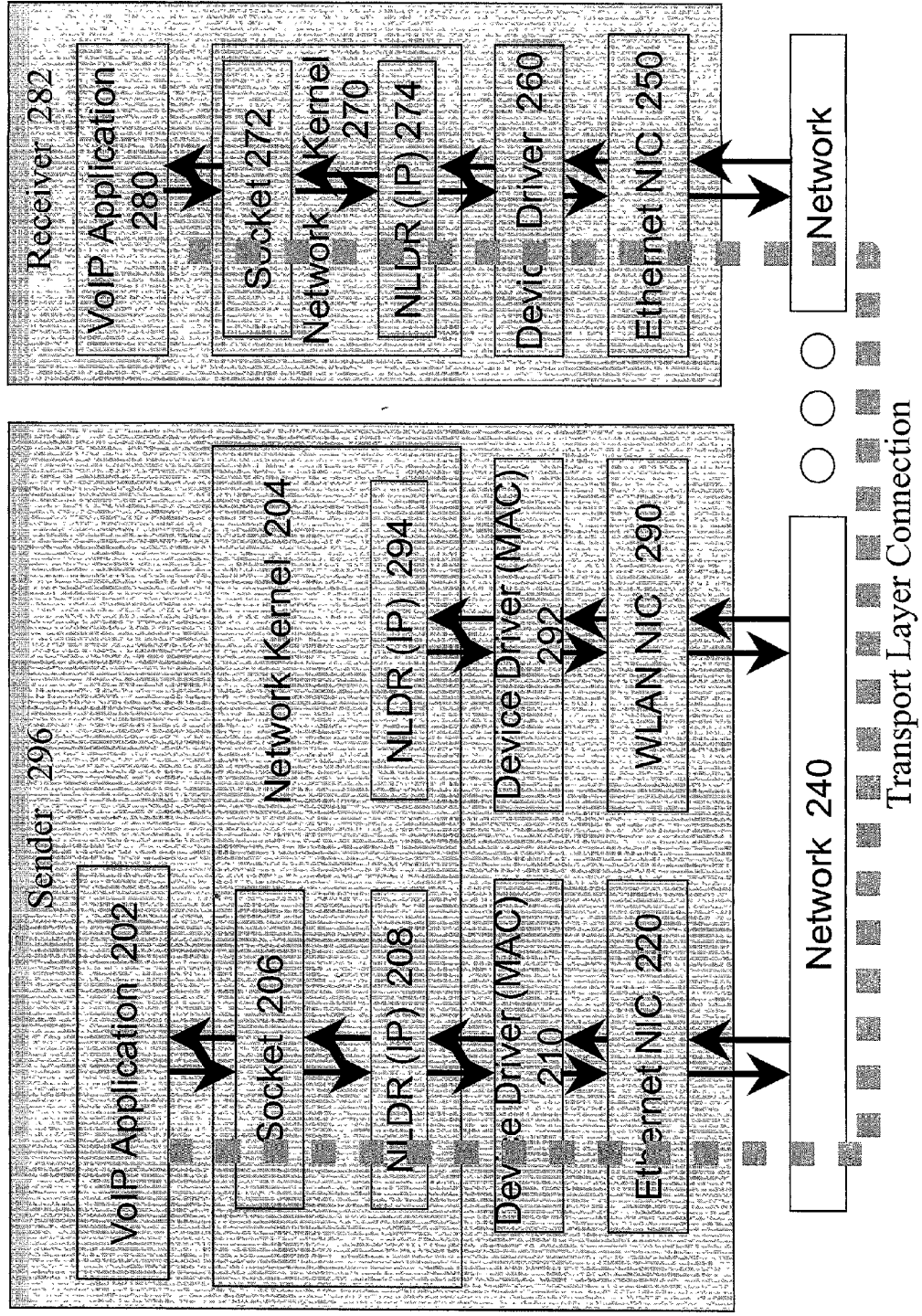
FIG. 2 shows a transport connection established between applications in the related art.
Figure 3:
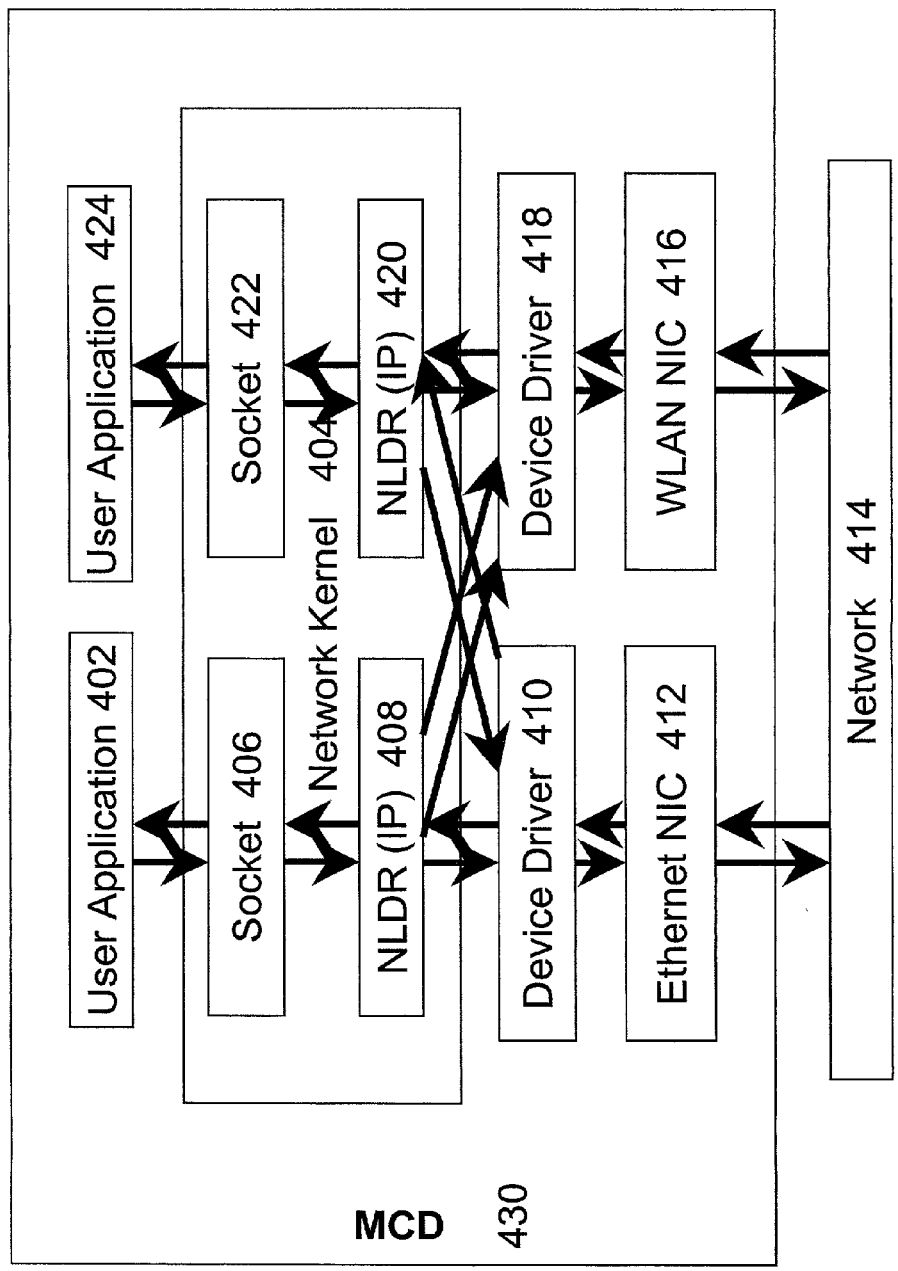
FIG. 3 shows an overview of the migration across link technologies, including dynamic MAC to IP binding, in the present invention.

FIG. 3 shows an overview of the migration across link technologies (MALT), including dynamic MAC to IP binding, in the present invention 400. As shown in FIG. 3, a user application 402 is coupled to a network kernel 404, through a socket 406 and a NLDR (IP) 408. The NLDR 408 is coupled to a device driver 410 (at the MAC layer), which is coupled to a network interface card 412, such as the Ethernet network interface card. The Ethernet network interface card is coupled to network 414. Network 414 is also coupled to various other network cards of the same MCD 430, including wireless LAN network interface card 416. WLAN NIC 416 is coupled to device driver 418 (at the MAC layer), which is coupled to NLDR 420, and to socket 422, and then to application 424.

As shown in FIG. 3, when performing link switching in the migration across link technologies of the present invention 400, communication between NLDR 408 is switched from device driver 410 to device driver 418. Also in MALT 400 of the present invention, if needed, communication of NLDR 420 is switched from device driver 418 to device driver 410. This switching, in the MALT of the present invention 400, is referred to as dynamic MAC to IP binding.

Components of the MALT 400 of the present invention include the ability to dynamically select the preferred link technology. Methods employed for selection of link technology in the MALT 400 of the present invention include polling a server, sending a ping message to the special IP address 224.0.0.1, which is a multicast IP address equivalent to everyone on the subnet (thus pinging this address effectively pings everyone on the subnet), statistics reading, and other methods. Another component of the MALT of the present invention includes updating the outgoing link by modifying the local routing table. Moreover, another component of the MALT of the present invention includes setting the local preferred incoming link and updating the foreign host's knowledge of the preferred incoming link through an extension of the Address Resolution Protocol (ARP).

These aspects of the present invention will be described in further detail, after an overview of the primary software modules involved with the implementation of a MALT solution of the present invention in a mobile computing device.

The present invention, migration across link technologies (MALT), comprises a method for switching between link technologies within a subnet while maintaining the transport layer connection. MALT of the present invention is based upon an extension of the Address Resolution Protocol (ARP) [RFC (IETF Request for Comment) 826].

Figure 4A:
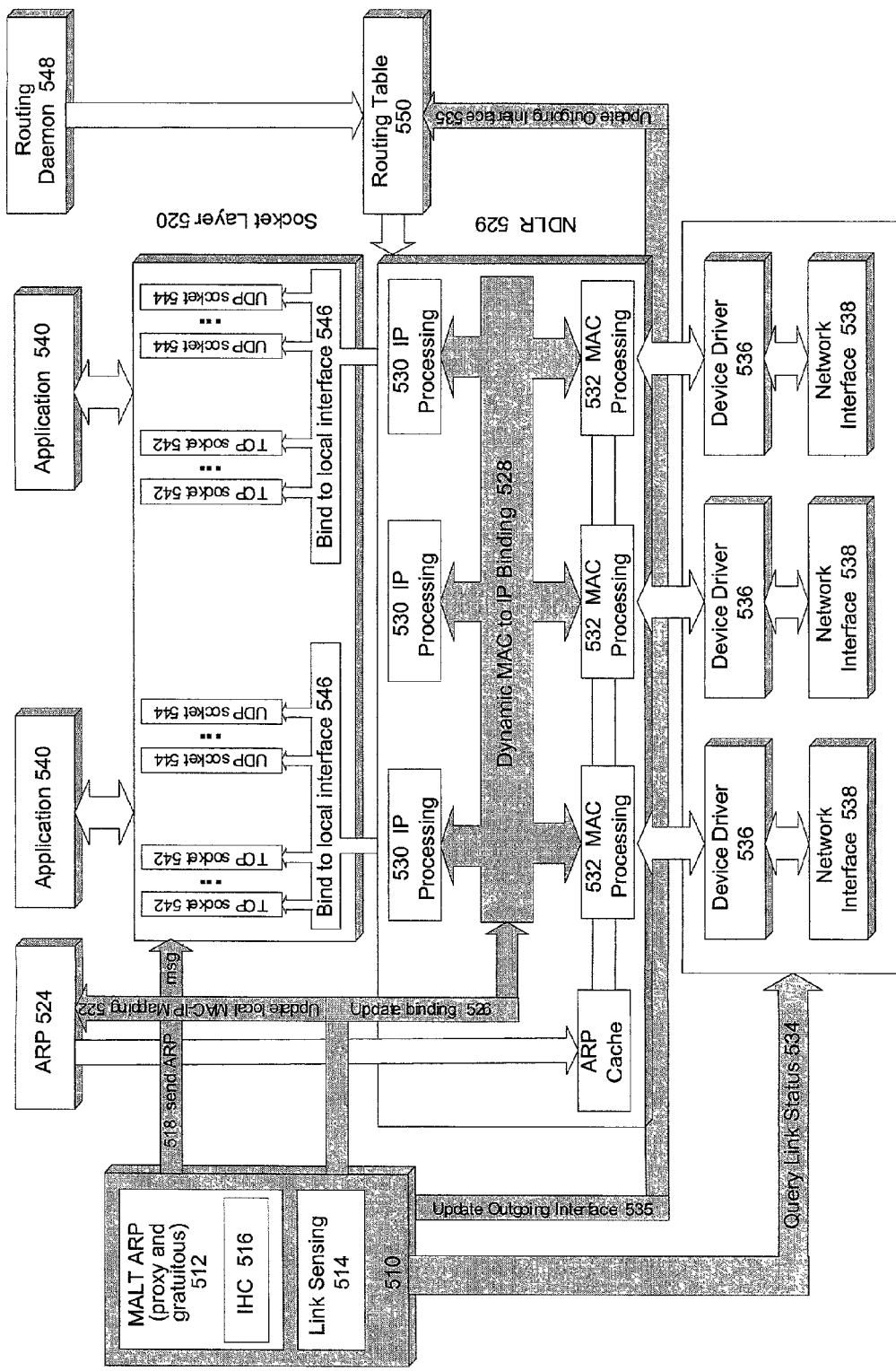
FIG. 4A shows the software modules in a MALT-enabled MCD of the present invention.

FIG. 4A shows the software modules in a MALT-enabled MCD 500. More particularly, FIG. 4A shows the primary software modules involve with the implementation of a MALT solution of the present invention in a mobile computing device, including conventional modules included in a mobile computing device.

As shown in FIG. 4A, the MALT of the present invention includes Link Migration Module (or MALT module) 510. Link Migration Module (LMM) 510 includes MALTARP Module (MAM) 512 and Link Sensing Module (LSM) 514.

The MAM 512 (which performs on both proxy and gratuitous ARP messages), includes Interested Host Cache (IHC) module 516. When MALT module 510 needs to send an ARP message 518, it sends the message via conventional socket layer 520. Moreover, LMM 510 issues an "update local MAC to IP mapping" command 522 to conventional ARP engine 524 so it will reply to future queries for any of the MCD's local IPs with the MAC address of the preferred interface. Additionally, LMM 510 sends an "update binding" command 526 to initiate the dynamic MAC to IP binding operation through the Dynamic MAC to IP Binding Module (DBM) 528 of the present invention. DBM 528 of the present invention interfaces, in the NDLR 529, between IP processing 530 and MAC processing 532. Moreover, LSM 514 interfaces 534 to device drivers 536 and network interface 538 to obtain link quality information.

That is, the MALT 500 of the present invention in a mobile computing device is implemented through the LMM 510, which interfaces to conventional software modules included in a mobile computing device. Using the MALT 500 of the present invention, no modification to applications (or application programs) 540, socket layer 520 (including TCP sockets 542, UDP sockets 544, socket binding mechanisms 546), routing daemon 548, routing table 550, IP processing 530, MAC processing 532, device drivers 536, or network interfaces 538, is required. Alternatively, most of the functionalities of the MALT of the present invention could be run as software module executed as a user-level application.

The MALT 500 of the present invention includes computer-readable medium storing a program which when executed by a computer causes the computer to execute the functions of migrating across link technologies on an IP-based subnet while maintaining on-going communication. The medium of the present invention comprises selecting a link, migrating the on-going communication to the selected link, and notifying interested hosts of the address of the selected link.

Conventional mobile computing devices includes static connections between the IP processing 530 and MAC processing 532, resulting in one IP address per network interface card. However, in the present invention, dynamic MAC to IP binding module 528 interfaces to both the IP processing modules 530 and multiple MAC processing modules 532 allowing for dynamic MAC to IP binding.

Figure 4B:
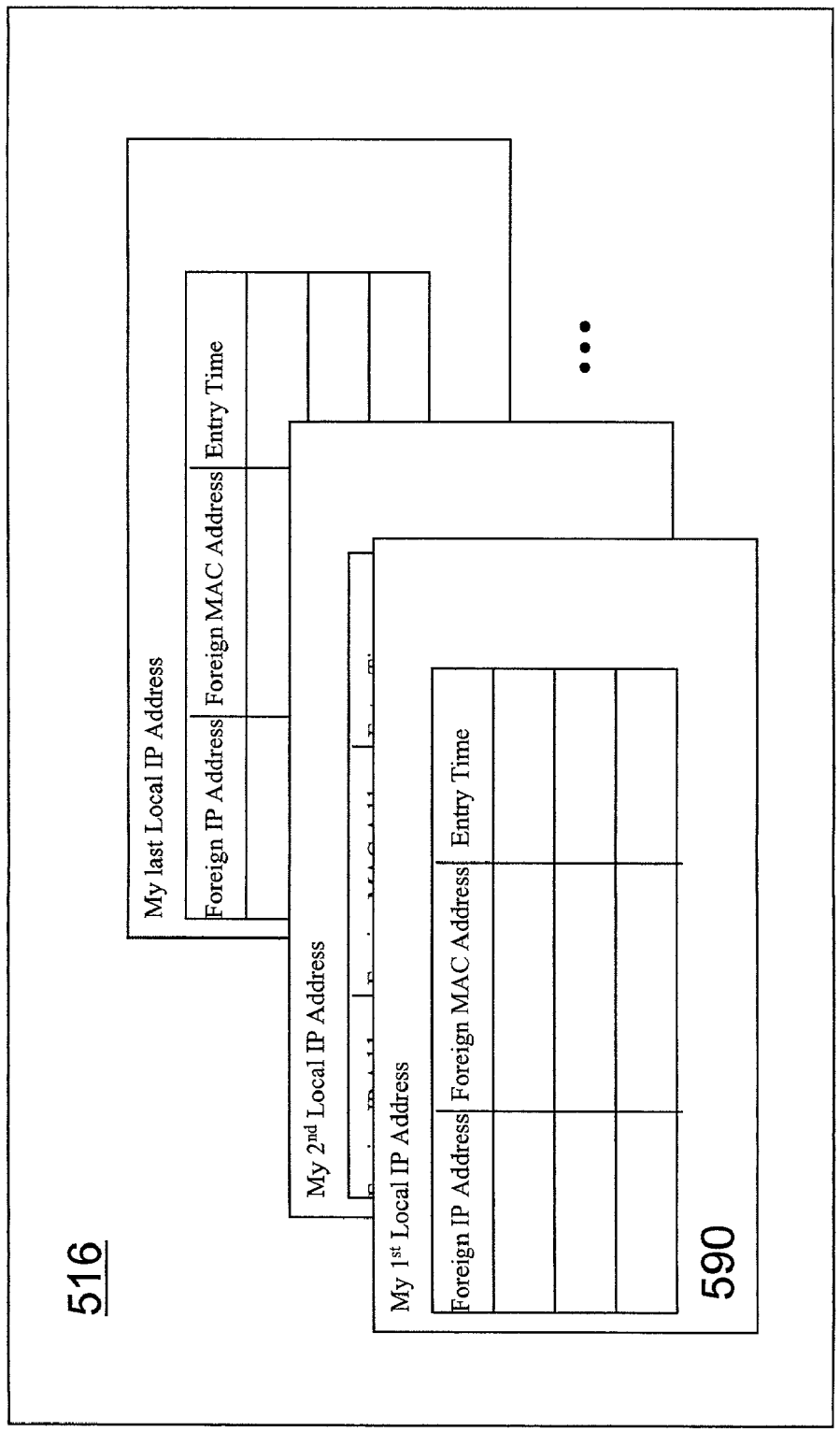
FIG. 4B shows a structure of the interested host cache (IHC) of the present invention.

FIG. 4B shows a structure of the Interested Host Cache (IHC) 516 of the present invention. At the local host (or mobile computing device), the IHC is a cache used for storing the IP and MAC addresses for each foreign (non-local) interface that is interested in communicating with a local network interface. The IHC comprises one data structure 590 for each local interface, indexed by the local interfaces IP address. In each data structure 590 there is a table for foreign interfaces MAC to IP address mapping. Each entry in a table is created when a foreign interface communicates with the corresponding local interface using ARP messages or the local interface communicates with the foreign interface using ARP messages. When an entry is created, the local host computer time is stored as the Entry Time variable, for use in purging the entry if it becomes too old.

Figure 5:
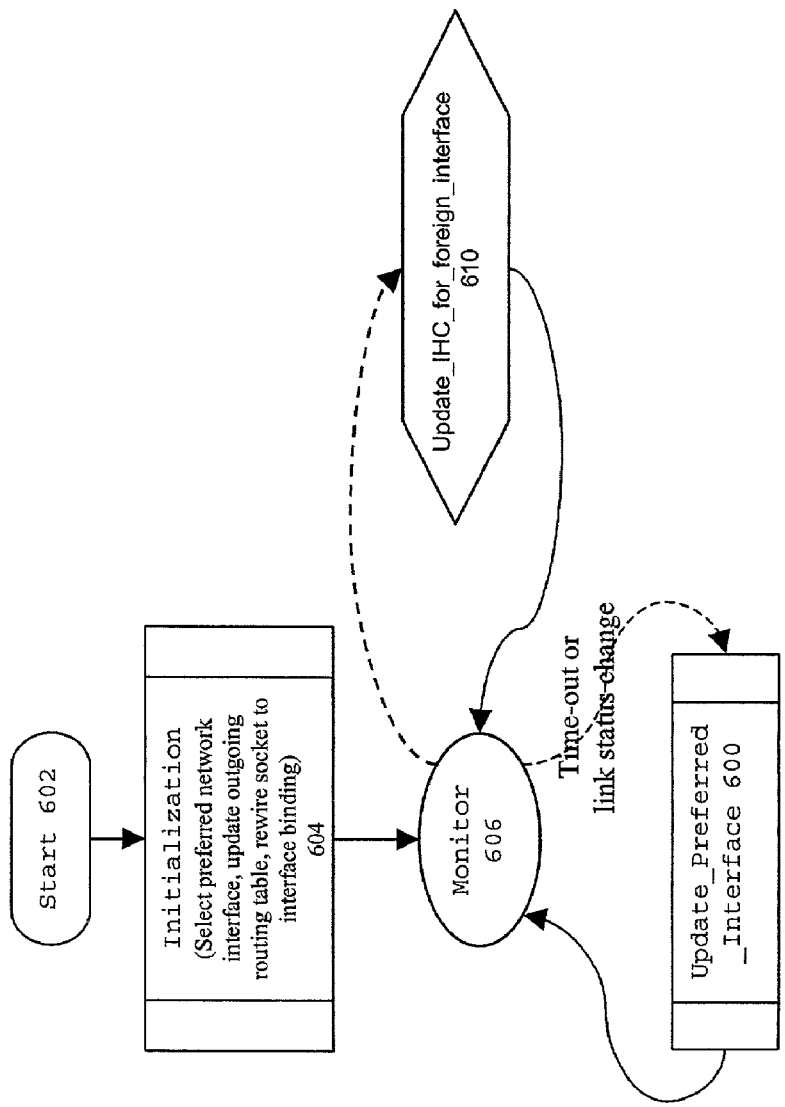
FIG. 5 shows a high level MALT flowchart of the present invention.

FIG. 5 shows a high level MALT flowchart 600, of the present invention. As shown in FIG. 5, after the start 602, an initialization function 604 selects the preferred network interface, updates the outgoing routing table, sets the socket interface binding. This initialization is accomplished by the link migration module 510 shown in FIG. 4A.

Then, control flows to the monitor function 606. If a timeout or a link status change is detected, then the update_preferred_interface function 608 is executed. If a host sends or receives an ARP message via a local interface, then the update_IHC_for_foreign_interface function 610 is performed on the IHC for the local interface with the IP and MAC address of the foreign interface. Examples of ARP messages received by the MCD executing the MALT of the present invention include an ARP_REPLY or an ARP_REQUEST.

After each of functions 608 and 610 is executed, control returns to the monitor function 606.

Figure 6:
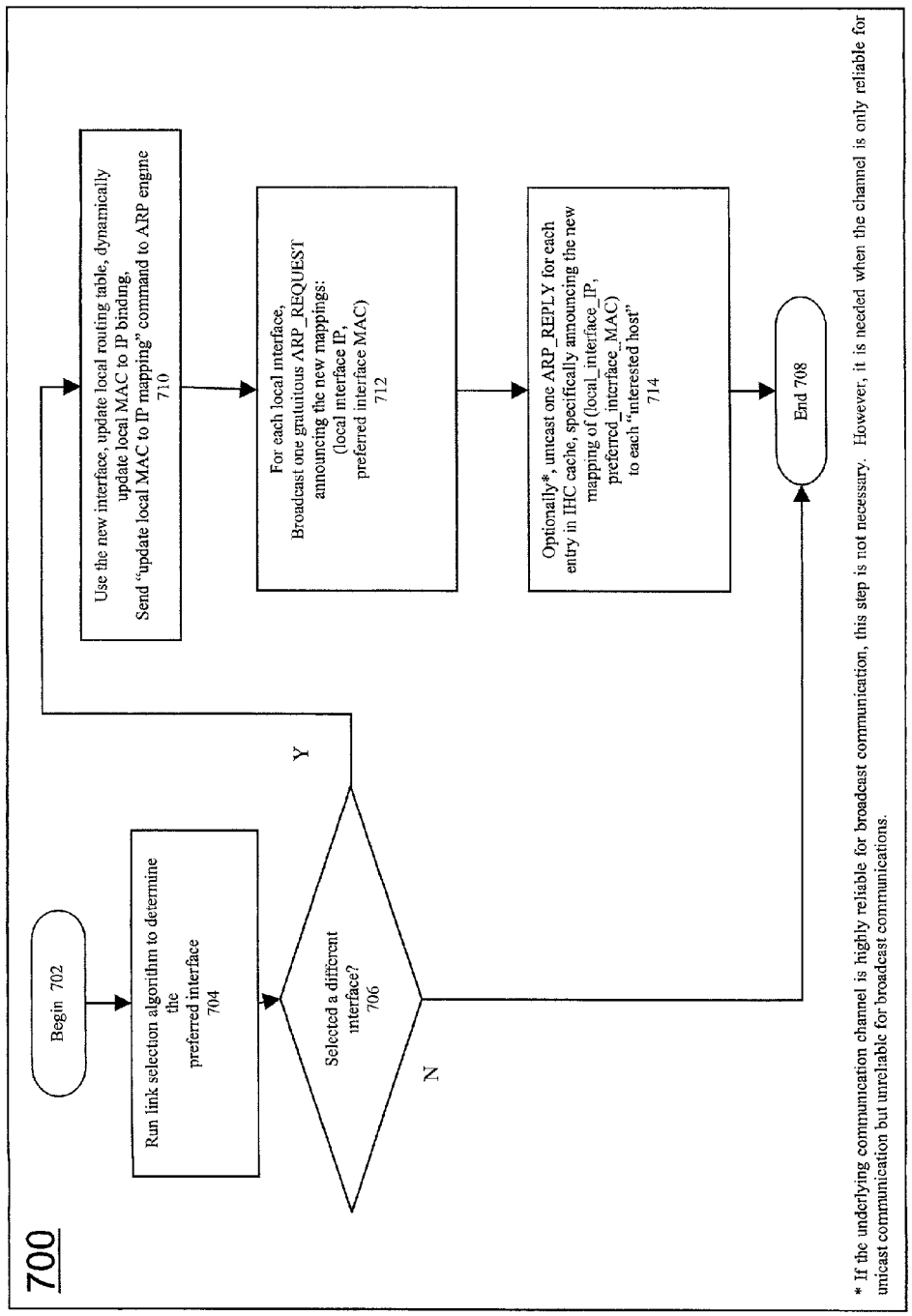
FIG. 6 shows the update_preferred_interface state flowchart of the present invention.

FIG. 6 shows the update_preferred_interface state flowchart 700 of the present invention, corresponding to the update_preferred_interface function 608 of the present invention shown in FIG. 5. Referring now to FIG. 6, after beginning the update_preferred_interface state flowchart 700, a link selection algorithm is executed 704 to determine the preferred interface. Subsequently, determination is made as to whether a different interface was selected 706. If a different interface was not selected, then the update_preferred_interface state flowchart ends 708. Alternatively, if a different interface was selected 706, then using the new interface, the local routing table is updated, and the local dynamic MAC to IP binding is updated 710. Then, for each local interface, one gratuitous ARP_REQUEST is broadcast 712 announcing the new mappings: (local interface IP maps to the preferred interface MAC). Next, and optionally, one ARP_REPLY is unicast 714 for each entry in the IHC, specifically announcing the new mapping to each "interested host". Function 714 is not necessary to be executed if the underlying communication channel is highly reliable for broadcast communication. However, function 714 is needed to be executed when the channel is only reliable for unicast communication but unreliable for broadcast communications.

Control then passes to end 708.

Figure 7:
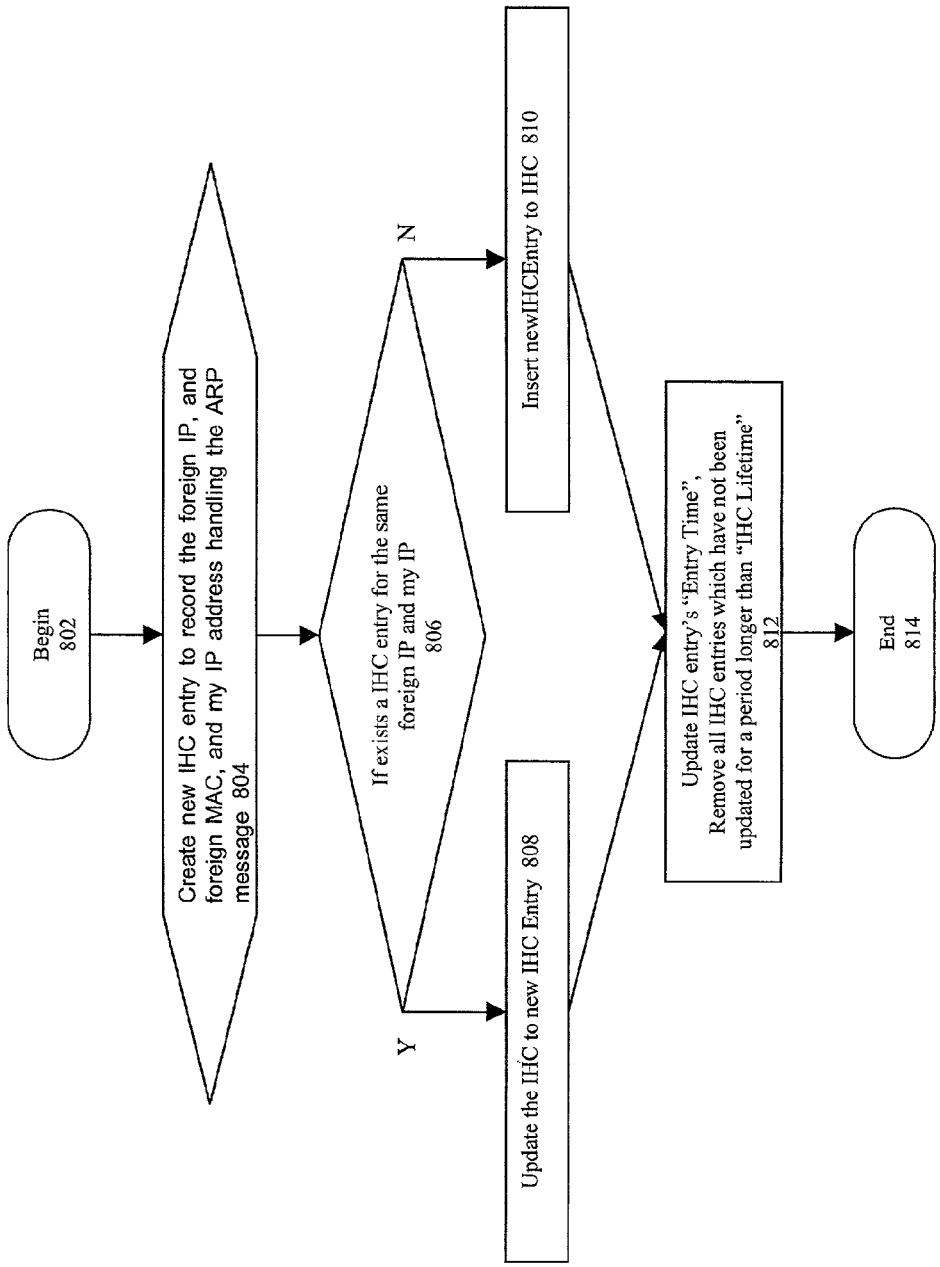
FIG. 7 shows the update IHC for foreign interface function of the present invention.

FIG. 7 shows the update_IHC_for_foreign_interface function 800 of the present invention, corresponding to the update_IHC_for_the_foreign_interface function 610 shown in FIG. 5. Referring now to FIG. 7, after beginning 802, a new IHC entry is created 804 to record the foreign IP, the foreign MAC and Entry Time in the data structure (corresponding to 590 of FIG. 4B) for the local interface handling the ARP message.

Then, a decision 806 about whether an IHC entry exists for the same foreign IP in the same data structure for the local interface (again, 590 of FIG. 4B) is made. If an IHC entry exists for the same foreign IP, then the existing IHC is updated 808 using the new IHC entry. However, if an IHC entry for the same foreign IP does not exist, then the new IHC entry is inserted into the interested host cache 810. If there is no data structure 590 for the local interface yet, a new data structure is created and the new IHC entry is inserted into this newly created data structure. In either case, a purge IHC 812 function is called to delete any IHC entry whose Entry Time value is older than a prespecified time, called the IHC Lifetime. If a data structure corresponding to a local interface has no entries, then the structure is deleted. The update_IHC_for_foreign_interface function ends 814, and control returns to the monitor function 606 shown in FIG. 5.

The MALT of the present invention is applicable to systems which include a single LAN to which access points for different wireless technologies are connected. A mobile computing device includes multiple network interfaces (wired and wireless) installed, in which each interface is capable of using its own technology to access a network.

Figure 8:
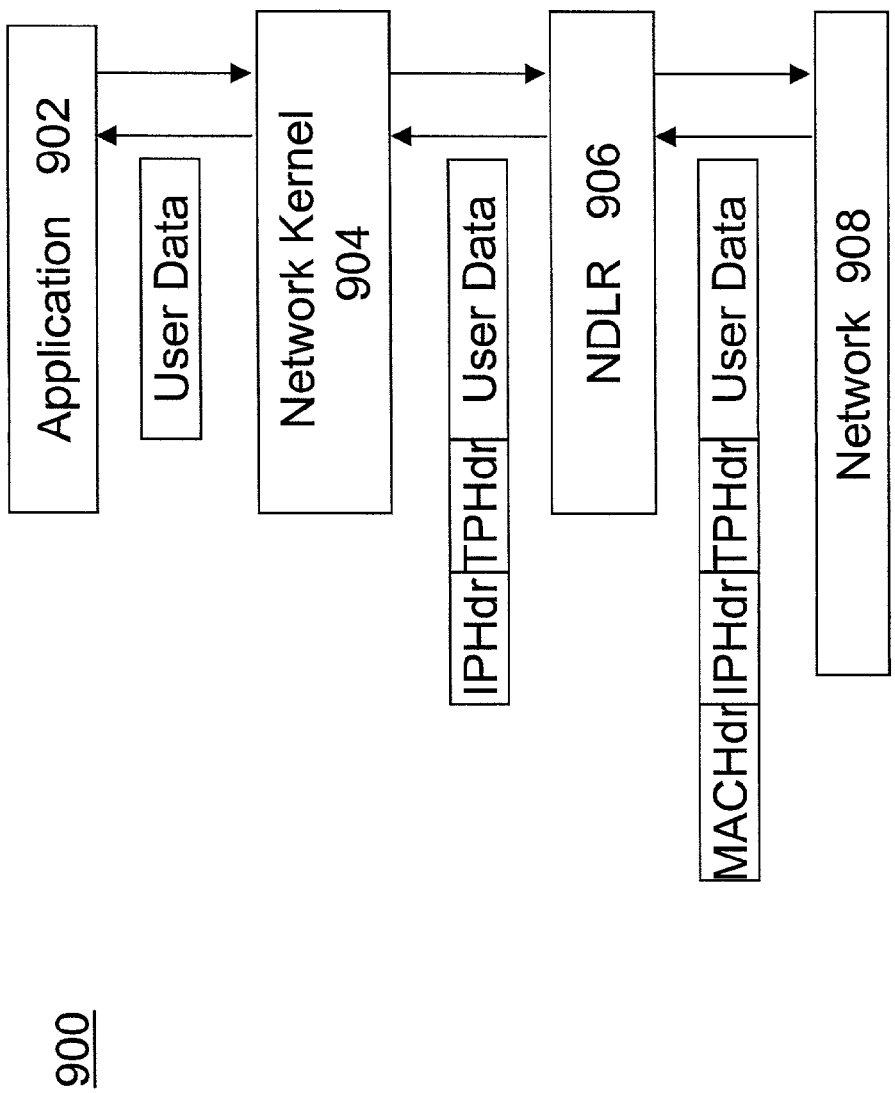
FIG. 8 shows updating the incoming link using MALT of the present invention.

FIG. 8 shows how user application data is packaged while it traverses the TCP/IP protocol stacks on both sender and receiver and the network. The sender application 902 transmits user data to the network kernel 904, which adds the transport header and the IP header to the user data, and transports the resultant packet to the device (include both software and hardware components of a network interface) 906. The device 906 adds the MAC header to the packet and transmits the resultant packets to the network 908. At the receiver end, layers of headers are peeled off in the reverse order as the packet is passed up in the stack. When an incoming packet arrives at the LAN where the receiving MCD resides, it is the packet's destination MAC address that determines which link of the MCD the packet uses to enter the MCD. Thus if a MCD's preferred link has been updated, it needs to notify other hosts on the same subnet of the new link's MAC address, so that future incoming packets will be addressed to the new link's MAC address and correctly arrive at the MCD via the preferred link. A more detailed description of updating the incoming link is presented hereinbelow.

In the present invention, it is assumed that roaming between access points of the same link technology (if service areas are continuous) is handled within each link technology communication protocol. For example, roaming between different 802.11b access points is typically handled within the 802.11b protocol. Such handoff will not cause interruption of transport connections because it is solved by the same link technology interface hardware and software. The identities of end points of the connection remain the same.

Link Selection

In order to switch between link technologies, a MCD must be able to detect link availability and determine a quality measure for each link and then select which link technology to use. The most desirable link (highest quality) at any given point in time may be a function of many factors including signal to noise ratio (SNR), cost for use, quality of service or traffic load. The link sensing module 514, shown in FIG. 4A, of the link migration module 510 of the present invention makes such a determination, and implements a link detection and selection algorithm of the present invention.

Using the link detection and selection algorithm included in link sensing module 514 of the present invention, link availability may be tested by having the mobile computing device periodically poll a server on the wired portion of the network via different link technologies. Another solution may not require the "link availability server" thus can be implemented completely on the MCD without introducing extra components to the network. For example, the mobile computing device may periodically send a ping message to the "all-host" multicast address 224.0.0.1 from each of its own interfaces and observe the echoes to determine the link availability. Link quality may be tested via various statistical and status readings from the device such as packet loss rate, signal quality, noise level, transmission rate, etc. The user may also input a cost factor for each technology so that economic reasons can also be considered in link sensing module 514. A user specified priority list (which is generally known in the art) can also be used as an alternative or in addition to the above-mentioned criteria. A link selection daemon can be implemented that periodically runs the link detection algorithm to determine which link is the best choice. If the current link is no longer the best option, and the new optimum is significantly better than the current selection, the daemon can initiate a link switch.

Mobile Computing Device Outgoing-Link Switch

After the best link is selected, the MALT of the present invention configures the mobile computing device to use the selected link as the default outgoing link. The Dynamic MAC to IP binding 528 is updated. Depending on the implementation of the NLDR, the existing routes of the internal routing table (including the default route) may also need to be updated to use the newly selected link.

Handling of Incoming Link Traffic

To redirect all incoming traffic to use the newly-selected interface involves both the mobile computing device and other parties on the network which can directly communicate with the MCD. These parties include the routers and other hosts on the same LAN as the MCD. All other computers on the Internet communicate with the MCD indirectly via the routers serving the LAN where the MCD resides. The MALT of the present invention accomplishes the handling of incoming link traffic.

Normal Handling of Transport Packets by Lower Layers

Before an explanation of the MALT of the present invention is presented, a brief explanation of the handling of transport packets by lower layers in a typical system is presented. In a typical system, the logical link, medium access control (MAC) and lower layers are implemented either in hardware or in software as device drivers that are supplied by hardware vendor as part of their network interface card package. The operating system (OS) makers publish the interface for device drivers to interact with the operating system so that other parties can develop the drivers independently without knowing the internals of the operating system. On the other hand, the socket layer and the NLDR layer are commonly implemented as native parts of the operating system and the boundary between the device driver and the NLDR is clearly defined. Typical interaction models between these two layers are also well known.

Statically or by dynamic mechanisms such as the Dynamic Host Configuration Protocol (DHCP), each interface is assigned an IP address when it is activated. Operating systems usually provide an interface for users to reset the interface for a new IP address. However, in this case the interface is reset and all connections utilizing the interface will be terminated. Thus, for the sake of discussion, this address remains unchanged until the interface is deactivated. Before an IP packet is passed to any network interface for transmission, the system needs to find the MAC address (also known as the hardware address) for the receiving interface of the next hop to which the IP packet is forwarded. The IP packet must be put into a MAC frame addressed to that next hop MAC address. If the size of an IP packet exceeds the payload limit of a MAC frame (known as the Maximum Transmission Unit, or MTU), the IP packet needs to be fragmented. In this case, one IP packet will be broken into pieces and put into multiple MAC frames (this added complication does not affect the present invention, so it is assumed that there is no fragmentation).

However, the routing table of the OS network kernel only provides the IP address of the next hop. Thus, this IP address of the next hop needs to be mapped to the corresponding MAC address, e.g., Ethernet address, so the MAC frame(s) can be appropriately addressed to the receiving interface of the next hop.

Such a mapping between an IP address and a MAC for a remote interface is typically learned by nodes exchanging ARP messages. When a mapping is needed but unknown, the transmitting node sends out a local broadcast ARP_REQUEST message asking "who knows the MAC address of this IP address, please tell me". The interface whose IP address is being asked for will then reply within an ARP_REPLY message containing the mapping. The learned mapping information is then put into an ARP cache on the requesting node so future requests for the MAC address of the same IP address can be resolved without asking other nodes on the network. Cached entries may age and eventually be removed by timeout.

Hiding Link Switching from Transport Connection

The MALT of the present invention dynamically and rapidly changes the MAC address that is mapped to an IP address and causes resulting incoming packets to be directed to the interface corresponding to the new MAC address. Accordingly, the MALT of the present invention switches between link technologies (identified by MAC addresses) without changing the end points (IP address, port number) of transport connections. The MALT of the present invention is based upon performing the underlying link technology switch quickly so that the timeout mechanism of the transport connection (a mechanism that transport layer uses to monitor the health condition of its connections) is not triggered, and as long as the IP end-points of a transport connection remain unaltered, then the transport connection remains uninterrupted because any change underneath the IP layer is hidden by the IP layer. Therefore, it appears to the transport layer that nothing is changed and there is no disturbance to the ongoing transport connection.

Notification of Mapping to Remote Nodes

Figure 9:
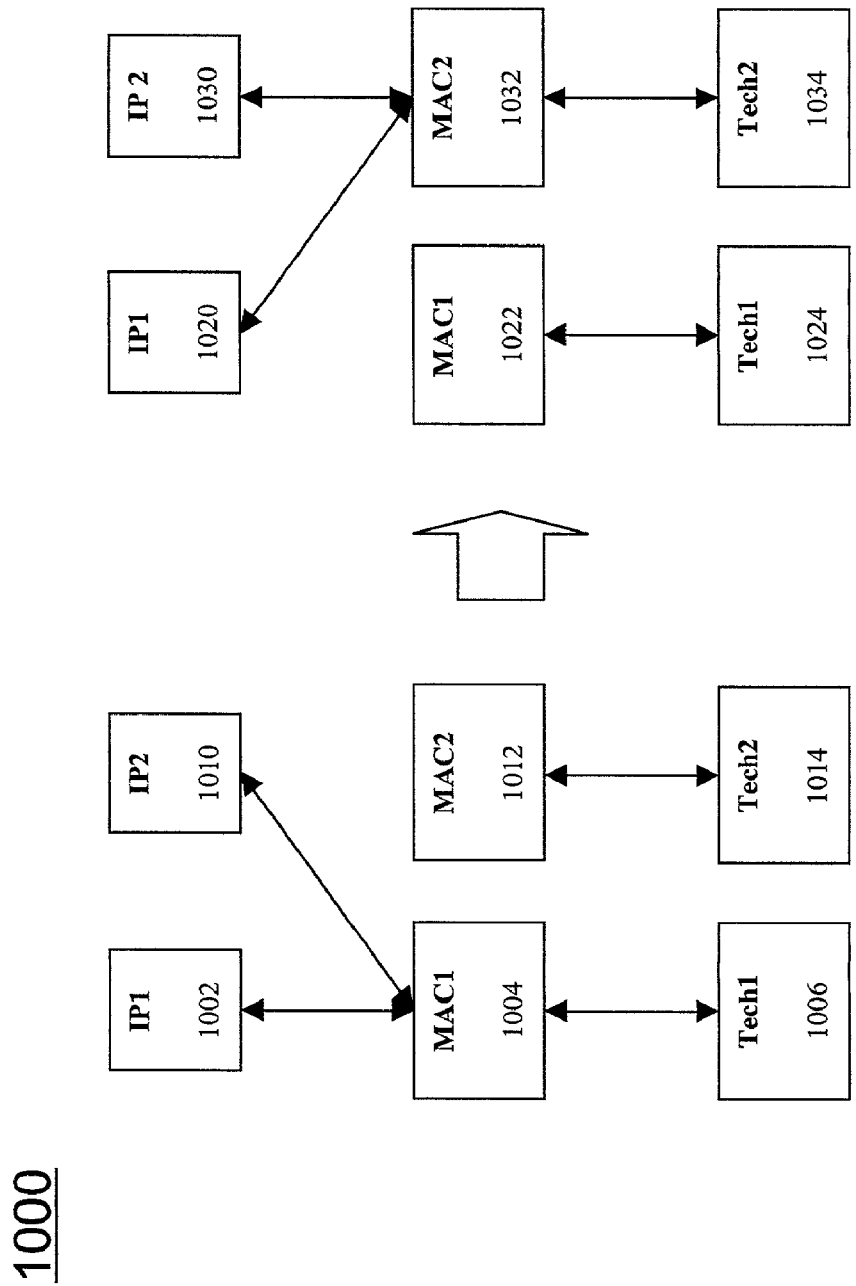
FIG. 9 shows the MAC to IP address mapping after link technologies switch, and MALT of the present invention.

FIG. 9 offers an example showing the bindings before and after a MCD switches its preferred link 1000 using MALT of the present invention. The switch is from link Tech1 1006 to link Tech2 1014. As shown in FIG. 9, a mobile computing device has two interface cards. The first interface card uses link technology Tech1 1006, having MAC address MAC1 1004, and assigned IP address IP1 1002. The second interface card has link technology Tech2 1014, MAC address MAC2 1012, and assigned IP address IP2 1010. When a transport connection is established, since Tech1 1006 is the selected link technology at the time, the transport connection is established using local IP address IP1 1002. This IP address is mapped on to local MAC address MAC1 1004, which is the hardware address for Tech1 1006 (network interface 1). After the user moves out of the service area of Tech1, then Tech2 becomes the preferred method for connectivity. Thus, the mapping is changed by the MALT of the present invention for IP1 1020 from MAC1 1022 to MAC2 1032, then any IP packets destined for IP1 will now be delivered via Tech2. As long as one IP address is uniquely mapped to one MAC address, the mapping does not have to be 1-to-1.

A node must know the receiving interface's MAC address to send it any IP packet. The Address Resolution Protocol, or ARP, is a protocol for finding an IP address to MAC address mapping, and includes ARP_REQUEST and ARP_REPLY.

That is, when a node switches the mapping for IP1 1020 from MAC1 1022 to MAC2 1032, other nodes on the same subnet need to be notified of the mapping change so that if they have packets for IP1 1020, the packets can be sent in MAC envelopes addressed to MAC2 1032 (over link Tech2 1034). For informing other nodes on the network about the new mapping, the MALT of the present invention presents a new extension of the ARP protocol. The MALT extension is based upon a combination of the "Proxy ARP" [RFC925, J. Postel, "Multi-LAN Address Resolution Protocol, RFC925, October 1984] and the "Gratuitous ARP" [W. Richard Stevens, "TCP/IP Illustrated, Volume 1: The Protocols", page 62, Addison-Wesley, Reading, Mass., 1994], two current special uses of the ARP protocol. The Proxy ARP is the mechanism for a router to answer ARP_REQUEST on one of its networks for a host on another of its networks.

The Gratuitous ARP is the feature that allows a host to send an ARP_REQUEST looking for its own IP address. This request can effectively be used for two purposes: to detect if there is another host on the network with the same IP address and to refresh other hosts' ARP caches about the requesting interface's address mapping. In Gratuitous ARP, a network interface requests the MAC address for its own IP, effectively announcing its own mapping.

In Proxy ARP, a network interface replies for other IP addresses using its own MAC address. Because the Proxy ARP is designed for hiding a network of hosts behind a single multi-homed computer, it typically requires the network behind the proxy (including the interfaces the proxy host uses to connect to that network) to be a mask-able sub-network of the network to which the interface performing the proxy is connected. As a result of such an addressing restriction, the proxy is usually one-directional. That is, only one interface can perform proxy duties for other interfaces. Another issue with current Proxy ARP is that it does not allow settings to be changed dynamically.

The MALT of the present invention does not restrict the addressing for interfaces as long as they are on the same subnetwork. An interface should be able to proxy for any other interfaces on the same host. On the other hand, at any given time, MALT only allows the "preferred" interface of that moment to proxy for other local interfaces by replying to ARP_REQUEST's querying for any of the host's interfaces. In the ARP_REPLY, the requested MAC address is set to the MAC address of the preferred interface.

Normally, the existing ARP uses a "poll" model where a requester queries and the other parties reply. The Gratuitous ARP introduces a way to "push" address mappings to other hosts on the network. However, the "pushed" mapping is broadcast to the network in an ARP_REQUEST message. Due to the special characteristics of wireless and mobile communication, such a mechanism is highly unreliable. Hosts connecting to the network via wireless links may not receive this message. Thus the MALT of the present invention introduces an additional mechanism to refresh the caches on other hosts in a more reliable manner.

MALT Extension to ARP

In the MALT of the present invention, a mobile computing device maintains a separate cache, referred to as the Interested Host Cache (IHC) and shown as element 516 in FIGS. 4A and 4B. The IHC 516 stores the identities of those who have asked for MAC address mappings of any of the MCD's own IP addresses and those who the MCD asked for their address mappings. These foreign hosts are named "Interested Hosts". In the ARP protocol, the host whose hardware address is requested will also remember the address mapping of the requester, since ARP assumes bidirectional communication. That is, if one host's address mapping is requested, then someone is attempting to talk with this host, and this host will likely talk back. Therefore, caching the ARP requester's address mapping will save this host from asking the requester again later. Thus, those from whom a MCD asked for the address mapping will also store the mapping for the MCD (contained in the ARP_REQUEST sent by the mobile computing device) and also need to be updated.

The IHC 516 entries remember both the MCD's corresponding local IP addresses and the IP addresses and MAC addresses of the interested hosts. Each entry in the IHC 516 may also age and eventually be removed. However, the lifetime for entries in the IHC 516 should be longer than the age-out period for any ARP caches on the network.

During a link switch, at first the MCD needs to broadcast one gratuitous ARP_REQUEST message for each of the MCD's local interfaces. In each of these gratuitous ARP_REQUEST messages, the source IP address is set to the IP address of the corresponding local interface. However, the source MAC addresses of all these gratuitous ARP_REQUEST messages are all set to the MAC address of the preferred local interface. Then the MCD also needs to unicast one ARP_REPLY for each entry found in the IHC. In each of these ARP_REPLY messages the source IP address is set to the MCD IP address of corresponding data structure 590 for the IHC entry while the source MAC address is set to the MAC address of the preferred interface. The destination IP address and MAC address are set to the values for the interested host as specified by the IHC entry.

Unicasting is often considered more reliable than broadcasting in wireless communication because wireless communication techniques may take advantage of the recipient identity and perform adequate channel reservation and acknowledgement mechanisms. Thus, using both the gratuitous ARP_REQUEST and unicast ARP_REPLY, the chance that any host who has the MCD's address mapping but is not updated should be low. If necessary, the gratuitous ARP operation can be periodically repeated for a small number of times to further reduce such a possibility. There might be some concerns about the number of ARP messages triggered by the link technology switching of the present invention. However, since the MALT of the present invention is running on a MCD, which is an edge host of a network, the MCD is likely to have a small IHC 516 and thus the overhead is acceptable.

In the MALT of the present invention, multiple interfaces are on the same LAN and assigned IP addresses on the same subnet. Otherwise, packets for one interface will not be routed to the subnet where the other interfaces are and packets will not be received via those other interfaces.

The MALT of the present invention enables mobile computing device manufactures to empower their products for mobile Internet applications. In addition, since MALT is switching between interfaces on a MCD in which both the new and the old interfaces are reachable on the same subnet, MALT does not require modification to routing protocols or the routing infrastructure of the Internet.

The MALT of the present invention caches the identities of all hosts that are interested in communication with the MALT node. After the link selection algorithm suggests a link switch, the MALT of the present invention updates its local ARP 524 mapping table and issues gratuitous ARP messages announcing mapping of the IPs of all of its interfaces to the newly-selected link's MAC. Subsequently, the MALT of the present invention asserts a special unicast ARP-REPLY to each host interested in communication. The newly-selected link's MAC address is used by the ARP module 524 in any ARP messages sent in response to ARP_REQUESTs for all interfaces.

TCP/IP Stack

In certain implementations of the TCP/IP stack, when one link technology becomes unavailable, the system will issue callbacks into upper layers so that any upper layer connections using the terminated link will also be notified and torn down.

In the MALT of the present invention, such functionality needs to be turned off. Otherwise, after a MCD moves out of the service area for one particular technology, such callback mechanisms may be triggered, resulting in the termination of transport connections established using this technology. Turning off the above-mentioned feature is generally implementation-dependent but straight forward.

Advantages of the MALT of the Present Invention

Using the MALT of the present invention, mobile users are able to roam across different types of networks seamlessly, without dropping on-going transport connections. Moreover, the MALT of the present invention can be implemented completely on the client-end as a software daemon; there is no need to upgrade existing network equipment.

More advantages of MALT can be illustrated using the following common communication scenario.

A user initiates a multimedia phone call from his MCD at his desk. At that time, the MCD is connected to a docking station that provides wired network connectivity. While wireless interfaces are equipped on the MCD and connectivity over these wireless technologies is also available, it is obviously better to use the wired network interface at that moment. Then during the phone call, the user needs to mobilize to another room in a building across the street. The user wants to keep the conversation during the whole course of his movement.

While his office and the room he is going to are both served by wireless Technology A (for instance, Bluetooth), access points for local outdoor connectivity on the campus are served by a different outdoor wireless technology B (for instance 802.11b). All access points are connected to the same backbone wired LAN. In reality, although it may be possible to use Technology B while in an office, it is likely that the link quality is poor due to the interception and attenuation of the signals from walls and ceilings/floors. Therefore it is preferred to use Technology A for indoor wireless connectivity and Technology B for outdoor.

As previously discussed, seamless roaming across link technology without dropping transport connection is not possible without the MALT of the invention. In a conventional system, after the user moves out of the service area of his current link technology, the transport layer connection is broken. The user needs to re-initiate the conversation (re-establish transport layer connections) using a different data link technology. If the phone application is smart enough, it may try to automatically redial to re-place the phone call with minimum amount of user interaction. In the above example, such a redial will occur after:

1. the MCD is taken off the docking station;
2. the MCD is moved out of the office; and
3. the MCD enters the destination room.

However, using the MALT procedures of the present invention, the telephone call proceeds without a noticeable interruption caused by the need to redial.

A comparison between what happens in different network layers with or without the MALT of the present invention is summarized in Table 1.

Currently, although various link quality testing mechanisms exist, they are not typically integrated with the MCD networking kernel. If a MCD needs to switch between link technologies, without the MALT technology the user needs to configure the changes manually. In addition, during a link technology switch, transport connections will be terminated in current systems. Some applications do employ their own "keep-alive" mechanisms to maintain communication sessions in such events. However, because the session layer typically does not have enough API support, these mechanisms are very simple. Even for these "smart" applications, usually it takes very long (10's of seconds even minutes) for the application to discover the link termination and re-establish the connection. On the other hand, since MALT is able to maintain transport connections while switching between link technologies, communication sessions are not affected at all.

TABLE 1

MALT Advantages

| | Current Technology | MALT |
|---|---|---|
| Link Technology Quality Sensing | Not integrated with networking kernel | Link quality auto-sensing |
| Switch Between Link Technologies | Manually configured | Auto-switch based on link quality and user profile |
| Transport Connection During Link Switch | Terminated | Maintained |
| Communication Session During Link Switch | Interrupted | Uninterrupted |

Because of the size and heterogeneity of the Internet, any new technology that requires mandatory upgrading of network equipment is likely to fail. MALT requires no infrastructure modifications and can be solely implemented on the client MCD side. Although a link quality detection server can help MALT in determining the most suitable interface, it is not required. There are other methods to perform the same task without the use of any additional network equipment. Using these methods, MALT becomes a totally MCD-side solution. This means that a MCD manufacture can implement the MALT into their product without the cooperation of any other network equipment product makers or service operators.

MALT is built upon the standard ARP protocol. Because ARP is supported by virtually all existing IP networks, MALT can be plugged into these networks without affecting the way these networks operate. Thus MALT is fully compatible with existing IP network equipments and infrastructures. It becomes straight-forward to introduce a product enhanced with MALT.

The present invention is advantageous if the IP addresses using different link technologies are located on the same subnet and served by different device drivers or network interface cards. If different link technologies are co-located on the same interface card and served by a single device driver, then the switching between the co-located technologies could be addressed within such a special-purpose interface card. By increasing the complexity of the interface card, the switching could be hidden within the physical and data link layers. Above the device driver, these two technologies would appear to be a single network interface, so as far as the rest of the MCD is concerned, there is no apparent switching between network interfaces. The MALT of the present invention could also be used in conjunction with the special-purpose interface card to provide switching between that special purpose interface card and other link technology interface cards. If IP addresses for the different links are located on different subnets, then other, more complex, methods are still necessary.

The present invention enables seamless roaming across link technologies while in the same broadcast domain while engaged in a transport layer session. In current systems, after a user moves out of the service area of his current link technology, the active transport layer connection is terminated. The system, or the user, needs to re-initiate the conversation using the alternate data link technology. Increased delay and possible loss of critical information occurs when the transport connection is broken, especially if the links use wireless technologies. The present invention permits the user-device to switch to an alternate link and causes any data destined for the former link to be delivered to the new link, without disconnecting the transport protocol. In many applications which use TCP/IP, such as multimedia conferencing, streaming audio/video, and worldwide web browsing with wireless devices, the responsiveness is greatly enhanced.

An MCD can be in communication (i.e., have a transport connection) with another device that may be anywhere on the Internet. In the present invention, only the MCD executing the MALT of the present invention is restricted to moving between service areas within a subnet; the other device (with which the MCD executing the MALT of the present invention is communicating) may be anywhere on the Internet. There is no restriction on the other device involved in the connection, and the other device may or may not be using the MALT of the present invention. If the other device is using the MALT of the present invention, then the other device could also be involved in roaming within its subnet.

Moreover, the present invention provides fault-tolerance in a mobile computing environment by maintaining on-going communication.

The present invention is implemented through modifications to the communications software that resides on a communications device that includes multiple communication link interfaces. Further, the interfaces reside on the same IP subnet. The present invention modifies the operation of the existing standard Address Resolution Protocol (ARP).

Although a simple method for determining when to cause a link switch and how to choose the best "link" for a switch is presented, the present invention is not limited to such a method as various methods of same are possible.

Moreover, the present invention can be extended to wireless technologies which include interfaces for long range connectivity (that is, a 3-G wireless modem), although for administrative reasons not typically given addresses on the same subnet as short or middle range interfaces, but in which a single networking administration body manages accesses via multiple link technologies and interfaces are given addresses on the same subnet. For example, a laptop computer in an office is likely to have addresses on the same subnet for its Ethernet card, its IEEE 802.11 card, and its Bluetooth card. Switching between interfaces on different broadcast domains is not in the scope of the present invention, and can be handled by network layer techniques such as Mobile IP or other modifications to the routing protocols.

Advantageously, the present invention includes the ability to maintain transport layer connectivity through link changes, resulting in a more satisfying user experience when accessing the internet from a mobile computing device such as a personal digital assistant (PDA). Maintaining transport layer connectivity through link changes with the present invention is important in devices with multiple, wireless link options in which coverage areas can be small and frequent link changes necessary as a user moves about.

Because of the popularity and large application space for Transport Control Protocol/Internetwork Protocol (TCP/IP) based networking, it is reasonable to initially introduce new wireless technology implementations as IP interfaces to gain acceptance. After a new wireless technology establishes its solid position and market share, as long as it is aimed for general-purpose communication between computing devices, it still needs to devote most of its usage to carrying IP data. Therefore the most user, application, and market friendly form of product for new wireless communication technology will be a Network Interface Card (NIC) that serves as the data link layer (and below) for the TCP/IP stack.

When the users are no longer bounded by the limitations of wired connectivity, the scenario described earlier will be quite common in the mobile computing era. However, current technologies cannot satisfy these sophisticated mobile users.

The MALT of the present invention provides transparent roaming across different link technologies and meets the demand for uninterrupted connectivity.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of switching in a device between a plurality of local link elements provided at the device, the device communicating on an IP-based single broadcast subnet, comprising:

when the device has an on-going communication in the IP-based single broadcast subnet via a first link element of the device having a first link-layer address, selecting a second link element of the device having a second link-layer address different than said first link-layer address, said on-going communication being identified by each local IP address of the device and including a transport-layer connection providing end-to-end communication between applications;

maintaining, by the device, an interested host cache (IHC) by storing for each local IP address of the device an address of a foreign host computer in response to receiving from a foreign host computer a request for link address mappings of any of IP addresses of the device or sending by the device for link address mappings of the foreign host computer; and migrating, by the device, the on-going communication from the first link element of the device to the second link element of the device while maintaining said on-going communication by:

locally in the device dynamically binding the second link-layer address of the device to same IP address, and notifying an interested host in the IHC, if any, of the second link-layer address of the device by unicasting an Address Resolution Protocol (ARP) reply message to the IHC host and for each local link element of the device notifying all other hosts on the single subnet by broadcasting a gratuitous ARP message on each local link element of the device.

2. The method as in claim 1, wherein the first link-layer address is a first MAC address and the second link-layer address is a second MAC address.

3. The method as in claim 1, wherein the on-going communication comprises a first IP address in communication with a first MAC address as the first-link layer address in communication with first link technology, and wherein said locally in the device dynamic binding comprises switching from the first MAC address to a second MAC address.

4. The method as in claim 1, wherein the on-going communication comprises an application, a socket, a Network Link Device Representation (NLDR), a device driver, a network interface card, and a network, the application being in communication with the socket, the socket being in communication with the NLDR, the NLDR having the IP address, the NLDR being in communication with the device driver, the device driver having a MAC address as the second-link layer address, the device driver being in communication with the network interface card, the network interface card being in communication with the network, said locally in the device dynamic binding comprises binding the second MAC address to the same IP address.

5. The method as in claim 3, wherein said switching is initiated and completed before a timeout mechanism in the transport-layer connection is triggered.

6. The method as in claim 3, wherein the notifying comprises notifying the interested host in the IHC of the second MAC address to the same IP address mapping.

7. The method as in claim 3, wherein the switching is in response to a received message.

8. The method as in claim 3, wherein the switching is in response to quality of the second link element.

9. The method as in claim 3, wherein the interested host is notified of the switching by a message.

10. The method as in claim 1, wherein the subnet is a subnetwork of the Internet.

11. The method as in claim 1, wherein the device is a mobile computing device and the selecting, the maintaining, and the migrating are executed by the mobile computing device.

12. The method as in claim 1, wherein the device is a client-side computer and the selecting, the maintaining, and the migrating are executed by the client-side computer.

13. The method as in claim 1, wherein the device is a host computer and the selecting, the maintaining, and the migrating are executed by the host computer.

14. The method as in claim 1, wherein said first link element has a different link technology than said second link element.

15. A device in communication with a foreign host computer and capable of switching between link elements provided at the device on an IP-based single broadcast subnet, comprising:

a link controller, when the device has an on-going communication in the IP-based single broadcast subnet via a first link element of the device having a first link-layer address, selecting a second link element of the device having a second link-layer address different than said first link-layer address, said on-going communication being identified by each local IP address of the device and including a transport-layer connection providing end-to-end communication between applications, maintaining an interested host cache (IHC) by storing for each local IP address of the device an address of the foreign host computer in response to receiving from a foreign host computer a request for link address mappings of any of IP addresses of the device or sending by the device for link address mappings of the foreign host computer; and migrating the on-going communication from the first link element of the device to the second link element of the device while maintaining said on-going communication by:

locally dynamically binding the second link-layer address of the device to same IP address, and notifying an interested host in the IHC, if any, of the second-link layer address of the device by unicasting an Address Resolution Protocol (ARP) reply message to the IHC host and for each local link element of the device notifying all other hosts on the single subnet by broadcasting a gratuitous ARP message on each local link element of the device.

16. The device of claim 15, wherein the link migration further comprises determining quality of a link, and selecting the second link element of the device based upon the quality of the second link element.

17. The device of claim 15,
wherein the on-going communication comprises a first IP address in communication with a first MAC address as the first-link layer address in communication with first link technology, and
wherein the local dynamic binding comprises switching from the first MAC address to a second MAC address.

18. The device as in claim 15, wherein the subnet is a subnetwork of the Internet.

19. The device as in claim 15, wherein the first link-layer address is a first MAC address and the second link-layer address is a second MAC address.

20. The device as in claim 15, wherein the device is a mobile computing device.

21. The device as in claim 15, wherein said first link element has a different link technology than said second link element.

22. A computer-readable medium storing a program, which when executed by a computer of a device in communication with a foreign host computer, causes the device to execute the functions of switching between link elements provided at the device and communicating on an IP-based single broadcast subnet, according to operations comprising:
when the device has an on-going communication in the IP-based single broadcast subnet via a first link element of the device having a first link-layer address, selecting a second link element of the device having a second link-layer address different than the first link-layer address, said on-going communication being identified by each local IP address of the device and including a transport-layer connection providing end-to-end communication between applications;
maintaining, by the device, an interested host cache (IHC) by storing for each local IP address of the device an address of a foreign host computer in response to receiving from a foreign host computer a request for link address mappings of any of IP addresses of the device or sending by the device for link address mappings of the foreign host computer; and
migrating the on-going communication from the first link element of the device to the second link element of the device while maintaining on-going communication by:
locally dynamically binding the second link-layer address of the device to same IP address; and
notifying an interested host in the IHC, if any, of the second link-layer address of the device by unicasting an Address Resolution Protocol (ARP) reply message to the IHC host and for each local link element of the device notifying all other hosts on the single subnet by broadcasting a gratuitous ARP message on each local link element of the device.

23. The medium as in claim 22, wherein the first link-layer address is a first MAC address and the second link-layer address is a second MAC address.

24. The medium as in claim 22, wherein the on-going communication comprises a first IP address in communication with a first MAC address as the first-link layer address in communication with first link technology, wherein said local dynamic binding comprises switching from the first MAC address to a second MAC address.

25. The medium as in claim 22, wherein the on-going communication comprises an application, a socket, a Network Link Device Representation (NLDR), a device driver, a network interface card, and a network, the application being in communication with the socket, the socket being in communication with the NLDR, the NLDR having the IP address, the NLDR being in communication with the device driver, the device driver having a MAC address as the second-link layer address, the device driver being in communication with the network interface card, the network interface card being in communication with the network, said local dynamic binding comprises binding the second MAC address to the same IP address.

26. The medium as in claim 24, wherein said switching is initiated and completed before a timeout mechanism in the transport-layer connection is triggered.

27. The medium as in claim 24, wherein the notifying comprises notifying the interested host in the IHC of the second MAC address to the same IP address mapping.

28. The medium as in claim 24, wherein the switching is in response to a received message.

29. The medium as in claim 24, wherein the switching is in response to quality of the second link element.

30. The medium as in claim 24, wherein the interested host is notified of the switching by a message.

31. The medium as in claim 22, wherein the subnet is a subnetwork of the Internet.

32. The medium as in claim 22, wherein the device is a client-side computer and the selecting, the maintaining, and the migrating are executed by the client-side computer.

33. The medium as in claim 22, wherein the device is a mobile computing device and the selecting, the maintaining, and the migrating are executed by the mobile computing device.

34. The medium as in claim 22, wherein the device is a host computer and the selecting, the maintaining, and the migrating are executed by the host computer.

35. The computer-readable medium as in claim 22, wherein said first link element has a different link technology than said second link element.

* * * * *